United States Patent [19]

Webb

[11] 4,330,223
[45] May 18, 1982

[54] ANTI-POLLUTION BARRIER

[75] Inventor: Michael G. Webb, Isle of Wight, England

[73] Assignee: The British Petroleum Company Limited, London, England

[21] Appl. No.: 244,516

[22] Filed: Mar. 16, 1981

[51] Int. Cl.$^3$ ............................................... E02B 15/04
[52] U.S. Cl. ....................................... 405/63; 405/66
[58] Field of Search ................................ 405/63, 66–72, 405/26; 210/242.3, 923

[56] References Cited

U.S. PATENT DOCUMENTS 3,638,429 2/1972 Sladek et al. ........................ 405/63
4,146,344 3/1979 Steen et al. ...................... 405/63 X

FOREIGN PATENT DOCUMENTS 1188156 6/1968 United Kingdom .

Primary Examiner—Price C. Faw, Jr.
Assistant Examiner—Nancy J. Pistel
Attorney, Agent, or Firm—Morgan, Finnegan, Pine, Foley & Lee

[57] ABSTRACT

A barrier for impeding the spread of oil spilt on water comprising two angled buoyant rigid elements (9 and 10) each of which is moulded onto a respective angled stiffener (2 and 5) to form Z-shaped members (1 and 4) in cross-section. The two Z-shaped members (1 and 4) are positioned back to back so that each is a mirror image of the other. The ends of the angled stiffeners (2 and 5) remote from the angled buoyant rigid elements (9 and 10) are rotatably connected and the two angled buoyant rigid elements (9 and 10) are releasably joined by a fastener 7. A flexible membrane (3) passes around the ends of the angled stiffeners (2 and 5) remote from the angled buoyant rigid elements (9 and 10), each end of the membrane (3) being moulded into one of the angled buoyant rigid elements (9 and 10).

6 Claims, 4 Drawing Figures

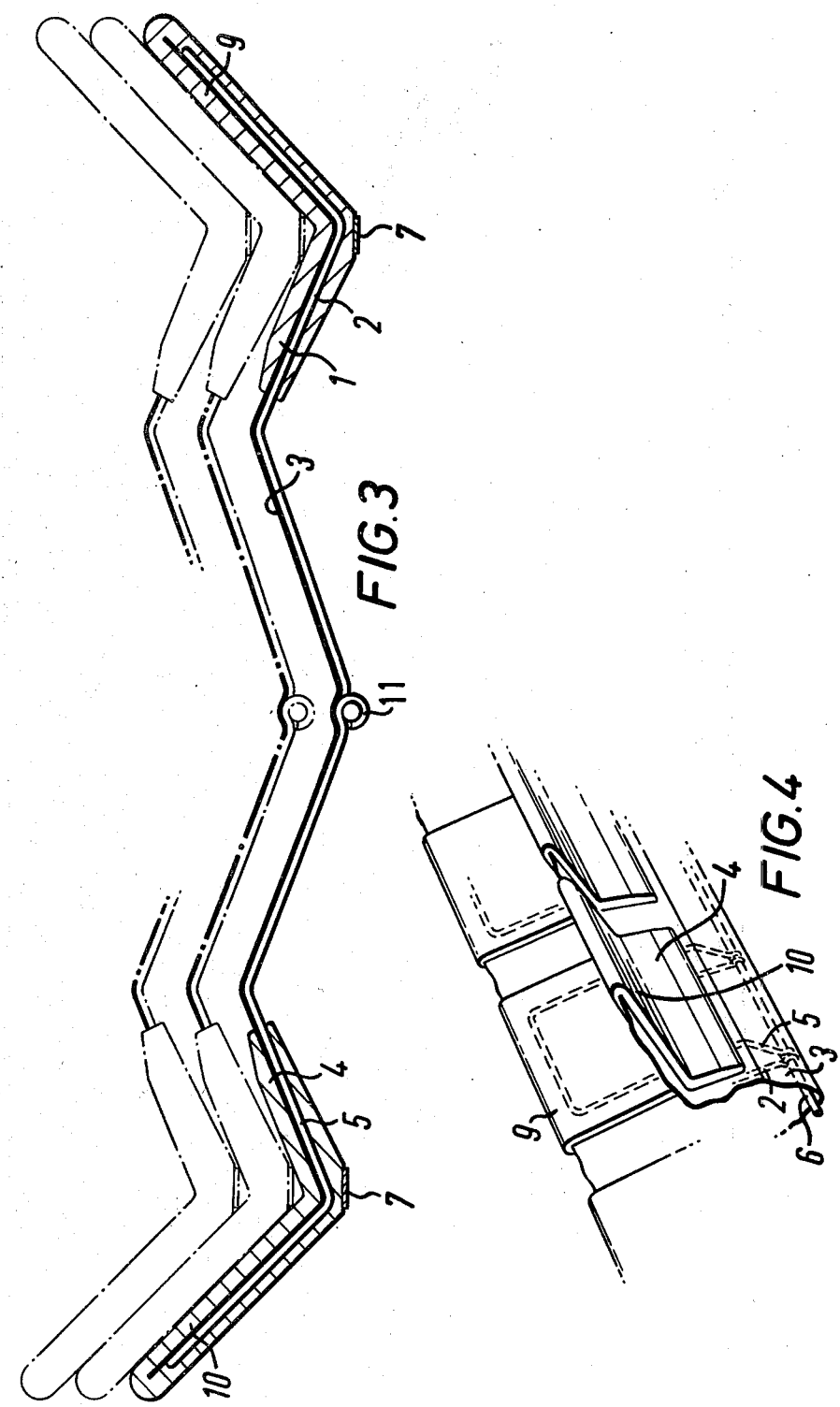

ANTI-POLLUTION BARRIER

BACKGROUND OF THE INVENTION

This invention relates to a barrier for impeding the spread of oil spilt on water.

When crude petroleum or petroleum products are transported there is a risk of accidental spillage or unauthorised discharge taking place. If this happens at sea or on inland waterways, the water is liable to become polluted by oil. In recent years several instances of pollution caused by collisions or groundings of tankers have occurred.

In order to prevent such spillages from spreading and from being carried ashore by winds and/or tides, various types of anti-pollution barriers have been devised.

Anti-pollution barriers, commonly referred to as booms, comprising continuous gas and water chambers are well-known and are described, for example, in UK Patent Specification No. 1188156. Essentially such booms have an elongated gas chamber which keeps them afloat and traps oil slicks and, attached below this, an elongated water chamber which gives the boom adequate stability and depth. The chambers are preferably substantially circular in cross-section when fully inflated. Preferred booms comprise a single water chamber and a single gas chamber and therefore have a figure of eight cross-section.

In some circumstances problems can arise in the deployment and recovery of such booms, particularly during inflating and deflating for which special equipment and trained operators are necessary. There is a need for a relatively simple barrier which can be easily deployed and recovered.

SUMMARY OF THE INVENTION

According to the present invention, a barrier for impeding the spread of oil spilt on water comprises two Z-shaped members in cross-section each of which comprises an angled buoyant rigid element attached to an angled stiffener to form a Z-shape in cross-section; the Z-shaped members being in side by side configuration so that each is a mirror image of the other with the ends of the angled stiffeners remote from the rigid elements being rotatably connected so that the Z-shaped members are capable of being bent back against each other and releasably joined at the angled buoyant rigid elements; a flexible membrane passes around the angled stiffeners enclosing the area between the stiffeners, each end of the membrane being attached to one of the angled buoyant rigid elements.

This description of the invention is intended as a summary only and the invention may be more fully appreciated upon consideration of the following detailed description and by reference to the accompanying drawings.

BRIEF DESCRIPTION OF THE DRAWINGS

In the drawings which illustrate the preferred embodiment of the invention:

FIG. 3 is a schematic diagram showing the Z-shaped members opened out for storage.

FIG. 4 is a schematic diagram showing a length of barrier having sections of angled buoyant rigid material with intervening sections of fabric.

DETAILED DESCRIPTION OF THE PREFERRED EMBODIMENT

Figure 1:
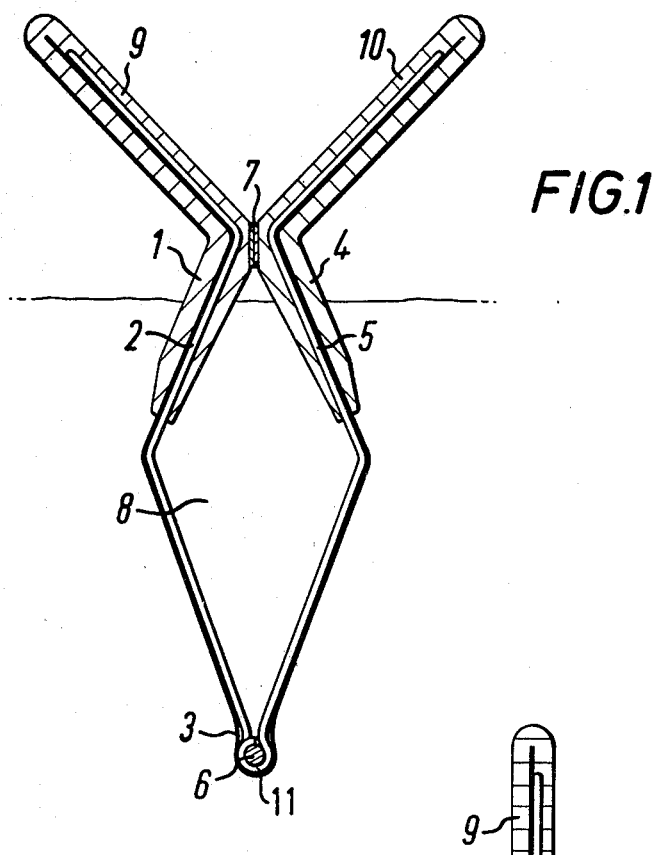
FIG. 1 is a vertical sectional view of the preferred embodiment of the anti-pollution barrier of the present invention.

Referring to the drawings, FIG. 1 is a vertical sectional view of the preferred embodiment of the anti-pollution barrier of the present invention as it would be arranged in use on oil polluted water.

The barrier comprises two angled buoyant rigid elements 9 and 10 each of which is moulded onto a respective angled stiffener 2 and 5 to form Z-shaped members 1 and 4 in cross-section. The two Z-shaped members 1 and 4 are positioned back to back so that each is a mirror image of the other, the axis of reflection in FIG. 1 being a vertical line drawn between the two Z-shaped elements 1 and 4. The ends of the angled stiffeners 2 and 5 not moulded into the angled buoyant rigid elements 9 and 10 are rotatably connected and the two rigid buoyant elements are releasably joined by a fastener 7. A flexible membrane 3 passes around the ends of the angled stiffeners 2 and 5 remote from the angled buoyant rigid elements 9 and 10, each end of the membrane 3 being moulded into one of the angled buoyant rigid elements 9 and 10.

The angled buoyant rigid elements 9 and 10 are substantially L-shaped and are adapted to be releasably joined back to back at the angle of the L-shape so that the arms project above the junction at an angle to each other. The included angle between the arms is preferably between 60 and 120 degrees and most preferably is 90 degrees.

Although the angled buoyant rigid elements 9 and 10 shown in FIG. 1 have straight arms with a relatively small radius of curvature at the angle of the L-shape, angled buoyant rigid elements in which the arms are slightly curved or which have a larger radius of curvature at the angle of the L-shape may also be used in barriers according to the present invention. Therefore the term "angled" should also be understood to include curves.

Suitable materials of construction for the angled buoyant rigid elements 9 and 10 include closed cell (i.e. water impermeable) foam plastics such as polystyrene and polyurethane.

The stiffeners 2 and 5 shown in FIG. 1 are Z-shaped in cross-section and one end of each stiffener is moulded into one of the angled buoyant rigid sections 9 and 10. The stiffeners need not be moulded into the buoyant sections. For example, a suitable barrier according to the present invention could be constructed by attaching the ends of each buoyant rigid element to one end of an appropriately shaped angled stiffener to form a Z-shaped member in cross-section. Any suitable means of attachment may be used, for example, clamping the ends between plates which are bolded together. In such a barrier the shape of the angled stiffeners would be similar to the lower part of the stiffeners 2 and 5 shown in FIG. 1, i.e. L-shaped. Preferably, however, the stiffeners are moulded into the buoyant rigid elements as shown in FIG. 1 since this construction is more robust.

The angled stiffeners 2 and 5 may extend along the whole length of the barrier but preferably they are suitably shaped wires positioned at regular intervals along the barrier.

The upper part of each stiffener 2 and 5 preferably has a shape in cross-section similar to that of the angled buoyant rigid elements into which it is moulded. The lower part of each angled stiffener completes the Z-shape in cross-section. As for the angled buoyant rigid elements, the stiffeners may be curved, therefore, the term "Z-shaped" should be taken to include curves which would make the members appear rather more S-shaped.

Each of the angled stiffeners 2 and 5 ends in an eyelet. (Only the eyelet 11 of the angled stiffener 5 is shown in FIG. 1.) A wire 6 which runs along the whole length of the barrier passes through each eyelet thus connecting the ends of the stiffeners remote from the angled buoyant rigid elements 9 and 10. The stiffeners may be rotated about the wire so that when the fastener 7 between the angled buoyant rigid elements 9 and 10 is released the Z-shaped members may be folded away from each other. The wire may be used to tow the barrier behind a support vessel or to anchor the barrier to a bankside or harbour wall, or to a buoy.

The flexible membrane 3 has one end moulded into the angled buoyant rigid element 9, passes around the stiffeners 2 and 5 and the wire 6 and has its other end moulded into the angled buoyant rigid element 10. Thus the flexible membrane 3 encloses the area between the stiffeners 2 and 5. The flexible membrane prevents oil escaping from the barrier by being carried under the angled buoyant rigid elements 9 and 10.

Preferably the flexible membrane is made from natural or synthetic fibres which are woven to produce water permeable fabrics. If the membrane 3 is water permeable, water can enter the area enclosed by the membrane thus effectively forming a ballast water chamber. The ends of the barrier may be open. The flexible membrane may be made from water impermeable fabric but this would require that the area enclosed by the membrane be filled with water by a pump or other suitable means and so the barrier may be more difficult to deploy.

A suitable releasable join between the angled buoyant rigid elements 9 and 10 may be made using a multi-hook fastener of the Velcro type.

FIG. 1 shows the barrier deployed in water. The lower ends of the angled buoyant rigid elements 9 and 10 and the flexible membrane 3 passing around the lower parts of the stiffeners together form a diamond-shaped water ballast chamber. Above the join 7 the upper arms of the L-shaped angled buoyant rigid elements 9 and 10 are at an angle to each other of about 90 degrees. The barrier floats with the join 7 at or about the surface of the water, its actual position depending on the buoyancy of the angled buoyant rigid elements 9 and 10 and the weight of the stiffeners 2 and 5, the wire 6 and the flexible membrane 3. The upper part of the barrier impedes the spread of oil on the surface of the water and the lower diamond-shaped enclosure forms a barrier to oil below the surface of the water thus mitigating the loss of oil under the barrier.

Figure 2:
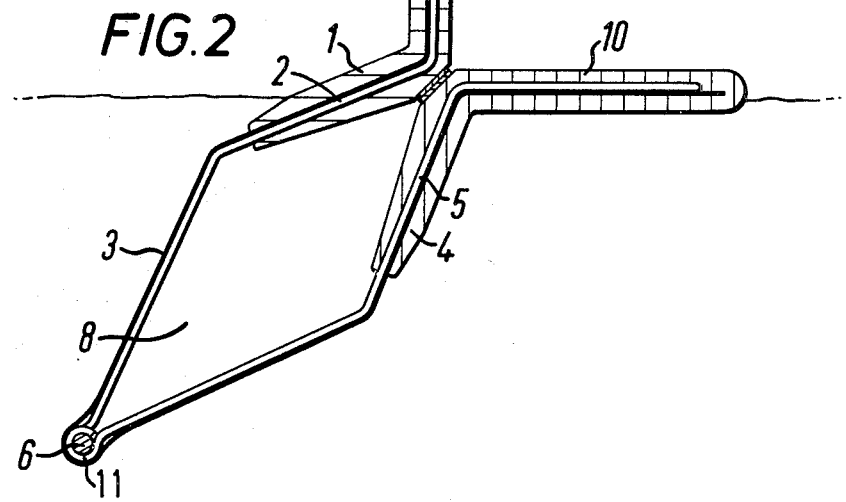
FIG. 2 is a vertical sectional view of the embodiment shown in FIG. 1 illustrating the attitude of the barrier when it is being towed.

FIG. 2 shows the attitude which the barrier adopts when being towed by the wire 6 or if the wire is anchored and a current or the wind is acting on the barrier. The barrier tilts over but the arms of the angled buoyant rigid elements 9 and 10 which project at an angle to each other above the join 7 ensure that there is always a barrier to impede the flow of oil. In FIG. 2 the upper part of the angled buoyant rigid element 10 is lying horizontally along the surface of the water while the upper part of the angled buoyant rigid element 9 is substantially perpendicular with respect to the surface of the water. The buoyancy of the upper section of the angled buoyant rigid element 10 resists the barrier being rotated further away from the vertical.

FIG. 3 shows the Z-shaped members opened out for storage. When the barrier according to the present invention is not required for use in water, the fastener 7 may be released and the Z-shaped members 1 and 4 rotated about the wire 6 so that they may be laid out relatively flat. In this manner sections of the barrier may be stored more conveniently than can the barriers when assembled for use. In the preferred embodiment shown in FIG. 3, the wire 6 passes through eyelets formed at the end of each of the stiffeners 2 and 5. This is a simple method of rotatably connecting the ends of the stiffeners remote from the angled buoyant rigid elements. Other suitable means for rotatably connecting the stiffeners may be used, for example, hinged connections.

FIG. 4 shows a barrier in which the angled buoyant rigid elements do not extend along the whole length of the barrier. Instead there are segments of angled buoyant rigid material with intervening sections of flexible membrane. The flexible membrane for use above the water should be water impermeable. In FIG. 1 the same flexible membrane is used between the angled buoyant rigid sections as is used to form the enclosed water chamber below the water. If the fabric of the membrane is water permeable, the sections above the water may be made water impermeable by, for example, treating it with a polyurethane solution.

I claim:

1. A barrier for impeding the spread of oil spilt on water comprising:
    (a) two Z-shaped members in cross-section each of which comprises an angled buoyant rigid element attached to an angled stiffener to form a Z-shape in cross-section,
    (b) the Z-shaped members being arranged so that each is a mirror image of the other with the ends of the angled stiffeners remote from the rigid elements being rotatably connected so that the Z-shaped members are capable of being bent back against each other and releasably joined at the buoyant rigid elements, with part of each angled buoyant rigid section projecting above the join and the parts projecting above the join being at an angle to each other,
    (c) a flexible membrane passing around the angled stiffeners enclosing the area between the stiffeners, each end of the membrane being attached to one of the angled buoyant rigid elements.

2. A barrier as claimed in claim 1 in which the included angle between the parts of the buoyant rigid elements projecting above the join is from 60 to 120 degrees.

3. A barrier as claimed in claim 2 in which the included angle between the parts of the buoyant rigid elements projecting above the join is 90 degrees.

4. A barrier as claimed in claim 1 in which the flexible membrane is water permeable.

5. A barrier as claimed in claim 1 in which the ends of the angled stiffeners remote from the angled buoyant rigid elements have eyelets through which passes a wire which runs along the whole length of the barrier.

6. A barrier as claimed in claim 1 in which the angled stiffeners are Z-shaped wires positioned at regular intervals along the length of the barrier and the angled buoyant rigid elements are moulded onto the stiffeners.

* * * * *